US012800526B2

(12) United States Patent
Oster et al.

(10) Patent No.: US 12,800,526 B2
(45) Date of Patent: Nov. 17, 2026

(54) METHOD AND DEVICE FOR ANALYZING AN IMAGE OF A MICROLITHOGRAPHIC MICROSTRUCTURED SAMPLE

(71) Applicant: Carl Zeiss SMT GmbH, Oberkochen (DE)

(72) Inventors: Jens Oster, Ober-Ramstadt (DE); Ralf Schoenberger, Rossdorf (DE); Mario Laengle, Jena (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 238 days.

(21) Appl. No.: 18/670,858

(22) Filed: May 22, 2024

(65) Prior Publication Data

US 2024/0393269 A1 Nov. 28, 2024

(30) Foreign Application Priority Data

May 22, 2023 (DE) ........................ 102023113273.3

(51) Int. Cl.
*G06T 7/13* (2017.01)
*G01N 23/203* (2006.01)
(Continued)

(52) U.S. Cl.
CPC ....... *G01N 23/2251* (2013.01); *G01N 23/203* (2013.01); *G06T 7/0004* (2013.01);
(Continued)

(58) Field of Classification Search
CPC . G06T 2207/30148; G06T 2207/30108; G06T 7/00; G06T 2207/10056; G06V 10/20; G06V 20/69; G06V 2201/06
See application file for complete search history.

(56) References Cited

U.S. PATENT DOCUMENTS 6,574,784 B1 * 6/2003 Lippincott .............. G06F 30/39 716/53
10,345,703 B2 * 7/2019 Hart .......................... G03F 7/24
(Continued)

FOREIGN PATENT DOCUMENTS

CN 115410213 11/2022 ............. G06V 30/20
DE 102005054401 6/2006 ............. G01B 21/02
(Continued)

OTHER PUBLICATIONS

The Office Action and Search Report issued by the Taiwan Patent Office for Application No. TW 113118785 dated Apr. 14, 2025 (with English Translation).
(Continued)

*Primary Examiner* — Guillermo M Rivera-Martinez
(74) *Attorney, Agent, or Firm* — Fish & Richardson P.C.

(57) ABSTRACT

A method for analyzing an image of a microstructured sample which comprises at least one first segment and at least one second segment which has an edge and is raised vis-à-vis the first segment, wherein the image includes a two-dimensional intensity distribution, comprising: determining edge candidates of the at least one second segment on the basis of gradients of the two-dimensional intensity distribution; determining a one-dimensional intensity distribution of the image in a direction (R) perpendicular to the edge candidates, wherein in the direction (R), the one-dimensional intensity distribution comprises a first region with a first mean intensity value, the edge candidates and a second region with a second mean intensity value greater than the first mean intensity value; and determining the edge candidate which among the edge candidates is closest to the first region of the one-dimensional intensity distribution as an edge of the at least one second segment.

20 Claims, 7 Drawing Sheets

(51) Int. Cl.
*G01N 23/2251* (2018.01)
*G06T 7/00* (2017.01)

(52) U.S. Cl.
CPC .......... *G06T 7/13* (2017.01); *G01N 2223/401* (2013.01); *G01N 2223/6116* (2013.01); *G06T 2207/10061* (2013.01); *G06T 2207/30148* (2013.01)

(56) References Cited

U.S. PATENT DOCUMENTS

| | | | | |
|---|---|---|---|---|
| 2001/0018153 | A1* | 8/2001 | Irie | G03F 7/70066 355/44 |
| 2002/0085286 | A1* | 7/2002 | Drodofsky | G03F 7/70141 359/627 |
| 2006/0012873 | A1* | 1/2006 | Totzeck | G03F 7/70566 359/386 |
| 2006/0109486 | A1 | 5/2006 | Nitta et al. | |
| 2007/0187595 | A1* | 8/2007 | Tanaka | G01N 23/2251 250/307 |
| 2008/0015813 | A1 | 1/2008 | Matsumoto | |
| 2009/0135399 | A1* | 5/2009 | Hirukawa | H10P 76/2041 355/71 |
| 2009/0238443 | A1* | 9/2009 | Sato | G06V 10/32 382/209 |
| 2013/0037729 | A1* | 2/2013 | Hell | G01N 21/6428 250/459.1 |
| 2013/0270436 | A1 | 10/2013 | Namai et al. | |
| 2014/0226139 | A1* | 8/2014 | Csete | G03F 7/70408 427/532 |
| 2015/0015862 | A1* | 1/2015 | Scholz | G03F 7/70108 355/67 |
| 2018/0182595 | A1 | 6/2018 | Yokosuka et al. | |
| 2018/0284622 | A1* | 10/2018 | Deguenther | G03F 7/70633 |
| 2020/0201286 | A1 | 6/2020 | Fujimura et al. | |
| 2020/0321187 | A1 | 10/2020 | De Loijer | |
| 2020/0409255 | A1* | 12/2020 | Tabbone | G06F 30/27 |
| 2022/0383485 | A1* | 12/2022 | Laengle | G06V 10/762 |
| 2023/0134093 | A1* | 5/2023 | Mack | H01J 37/222 382/108 |

FOREIGN PATENT DOCUMENTS

| | | | |
|---|---|---|---|
| DE | 102021113764 | 12/2022 | G06V 30/20 |
| JP | 2006/170969 | 6/2006 | G01B 15/00 |
| JP | 2006/324682 | 11/2006 | H01L 21/66 |
| JP | 2007/292732 | 11/2007 | G01B 15/00 |
| JP | 2017/062174 | 3/2017 | G01B 15/04 |
| JP | 2022/183129 | 12/2022 | G03F 1/84 |
| TW | 202037999 | 10/2020 | G03F 1/20 |
| WO | WO 2012/056639 | 5/2012 | H01J 37/22 |

OTHER PUBLICATIONS

The Decision to Grant a Patent issued by the Japanese Patent Office for Application No. JP 2024-082771, dated Jun. 23, 2025 (with English Translation).

The Extended European Search Report issued by the European Patent Office for Application No. EP 24 17 6552 dated Oct. 28, 2024 (with English Translation).

Mack et al., "Improvements to the Analytical Linescan Model for SEM Metrology," *Metrology, Inspection and Process Control for Microlithography XXX*, Proceedings of SPIE, vol. 9778, pp. 97780A-1-97780A-9 (2016).

* cited by examiner

METHOD AND DEVICE FOR ANALYZING AN IMAGE OF A MICROLITHOGRAPHIC MICROSTRUCTURED SAMPLE

CROSS-REFERENCE TO RELATED APPLICATIONS

This application claims priority to German Patent Application DE 10 2023 113 273.3, filed on May 22, 2023, the contents of which are incorporated herein by reference in their entirety.

TECHNICAL FIELD

The present invention relates to a method and a device for analyzing an image of a microlithographic microstructured sample.

BACKGROUND

Microlithography is used for producing microstructured components, for example integrated circuits. The microlithography process is carried out using a lithography apparatus comprising an illumination system and a projection system. The image of a mask (reticle) illuminated by use of the illumination system is projected here by use of the projection system onto a substrate, for example a silicon wafer, which is coated with a light-sensitive layer (photoresist) and arranged in the image plane of the projection system, in order to transfer the mask structure to the light-sensitive coating of the substrate.

Driven by the desire for ever smaller structures in the production of integrated circuits, EUV lithography apparatuses that use light with a wavelength in the range from 0.1 nm to 30 nm, in particular 13.5 nm, are currently under development.

As the structure sizes of both the masks used in the lithography process and the microlithographically structured wafers become ever smaller, the analysis and the processing or repair of these components is becoming ever more of a demanding challenge in practice.

For the purpose of analyzing microstructured samples, for instance microstructured lithography masks and wafers, microscopically captured images, inter alia, are evaluated in order to determine differences present between the respective measured image and a design image including the intended structure of the sample. In particular, the microscopically captured images are images captured on the basis of electron beams or ion beams (e.g. scanning electron microscope images, SEM images for short). Differences determined on the basis of such images between the respective measured image and the design image including the intended structure of the sample are used as a basis for processing and/or repairing the sample. As a rule, the images to be analyzed are composed of a multiplicity of pixels in this case, with each pixel being assigned an intensity value as a "greyscale value."

For instance, evaluating the microscopically captured images of the microstructured sample comprises a contour detection or extraction (edge detection or extraction) of structures of the microstructured sample. A conventional approach for determining structure edges in the sample is based on, e.g., forming a gradient (i.e. the first derivative) of the two-dimensional intensity distribution (i.e. of the greyscale value profile) of the image, for example as described in DE 10 2021 113 764 A1. Detecting edges can be made more difficult on account of a low signal-to-noise ratio of the utilized images of the microstructured sample. Moreover, artefacts on the mask (e.g. a granulation on the surface) and of the imaging (lightening, for example an edge brightening or a lightening due to electric charge) can make edge detection more difficult.

SUMMARY

Against this background, it is an aspect of the present invention to provide an improved method and an improved device for analyzing an image of a microlithographic microstructured sample.

Accordingly, a method is proposed for analyzing an image of a microlithographic microstructured sample. The sample comprises at least one first segment and at least one second segment which has an edge and is raised vis-à-vis the first segment. Further, the image includes a plurality of pixels and a two-dimensional intensity distribution depending on the pixels. The method comprises the following steps:

a) determining a plurality of edge candidates for an image representation of the edge of the at least one second segment on the basis of gradients of the two-dimensional intensity distribution, b) determining a one-dimensional intensity distribution of the image in a direction perpendicular to the plurality of edge candidates, wherein in said direction, the one-dimensional intensity distribution comprises a first region with a first mean intensity value, the plurality of edge candidates and a second region with a second mean intensity value greater than the first mean intensity value, and c) determining the edge candidate of the plurality of edge candidates which among the plurality of edge candidates is closest to the first region of the one-dimensional intensity distribution as the image representation of the edge of the at least one second segment.

Consequently, a plurality of candidates for an image representation of the edge of the at least one second segment of the microstructured sample can initially be determined in the image of the sample. For instance, determining image artefacts as edge candidates (for example on account of a low utilized threshold value for an absolute value of the gradient) can be acceptable at this stage. Then, an edge candidate can be selected from the plurality of determined edge candidates by evaluating the one-dimensional intensity distribution of the image in the direction (orthogonal direction) perpendicular to the plurality of determined edge candidates and can consequently be determined as image representation of the edge of the second segment. In particular, an edge candidate is selected from the plurality of determined edge candidates by virtue of determining the edge candidate located closest to the first region of the one-dimensional intensity distribution—and consequently closest to the region of the one-dimensional intensity distribution with the lower mean intensity value (i.e. the darker region in the image)—as image representation of the edge of the second segment. The darker region in the captured image usually corresponds to the lower-lying structure of the sample (i.e. the at least one first segment of the sample).

Consequently, the pose or position of edges of the microstructured sample can be better detected. In particular, artefacts are also better rejected. In particular, the edge positions determined by the proposed method are placed against the geometric shape of the at least one second segment with greater accuracy in every detail and more precision in their positioning. Further, an edge position is determined which, in comparison with conventional methods, is located closer in the direction of the lower-lying structure of the sample.

For instance, the microscopically captured image of the sample is an image captured by use of a particle beam, e.g. an electron beam or ion beam. The microscopically captured image of the sample for instance is a scanning electron microscope image (SEM image) of the sample.

For instance, at least some of the sample is captured in the microscopically captured image of the sample. Moreover, the microscopically captured image of the sample in particular captures at least some of the first and second segment and the edge of the second segment which separates the second segment from the first segment.

In particular, the image analyzed by the method comprises a plurality of two-dimensionally arranged pixels. Each pixel is assigned a respective intensity value. In particular, the two-dimensionally arranged intensity values form the two-dimensional intensity distribution of the image.

For instance, the at least one second segment has a circumferential, closed overall edge parallel to a plane of main extent of the sample and/or perpendicular to a line-of-sight of an image recording device. For instance, the image representation of the edge of the second segment determined in the method may correspond to a portion of the overall edge.

For example, the at least one first and second segment each are connected regions parallel to the plane of main extent of the sample and/or perpendicular to the line-of-sight of the image recording device. What applies to such a connected region is that any two points in such a region can always be connected by a path located entirely within this region.

In particular, the edge of the at least one second segment of the sample is a physical boundary of the second segment, which separates the second segment from the first segment.

For instance, in step a) a plurality of parallel edge candidates for an image representation of the edge of the at least one second segment are determined on the basis of gradients of the two-dimensional intensity distribution.

In particular, a plurality of edge candidates for one and the same edge (e.g. for one and the same portion of an overall edge) of the at least one second segment are determined in step a) on the basis of gradients of the two-dimensional intensity distribution.

For example, determining the plurality of edge candidates for an image representation of the edge of the at least one second segment on the basis of the gradient of the two-dimensional intensity distribution in step a) is implemented on the basis of suitable known processes, for instance "Canny", "Laplacian of Gaussian", "Sobel", etc. It is also possible to apply two or more of these processes (e.g. in succession). In addition to that or in an alternative, it is also possible to apply one and the same edge extraction process multiple times with different parameter settings.

For instance, determining the plurality of edge candidates for an image representation of the edge of the at least one second segment on the basis of the gradient of the two-dimensional intensity distribution includes the determination of a gradient of the intensity distribution at each pixel in the image. A gradient for a specific pixel is for instance determined on the basis of the evaluation of a predetermined number of pixels surrounding this pixel. For example, the predetermined number includes the pixels arranged around the central pixel in a square with a size of 3×3 pixels, 5×5 pixels, 7×7 pixels, 9×9 pixels and/or 11×11 pixels. In this case, the individual pixels can be included in the calculation of the gradient with different predetermined weights. For example, determining the plurality of edge candidates of the second segment includes the determination of a matrix of gradients (e.g. a gradient image) from the original image (i.e. the two-dimensional intensity distribution). The edges of the segments captured in the image are located at those pixels where the intensity (brightness) of the original image is undergoing the greatest change, and hence the gradient image has the highest intensities. In other words, an edge corresponds to a region of large gradients in the intensity distribution.

For instance, determining the plurality of edge candidates for an image representation of the edge of the second segment in step a) includes a determination of pixels of the image which are candidates for edge pixels.

In particular, in step c), the edge candidate of the plurality of edge candidates which among the plurality of edge candidates is closest to the first region of the one-dimensional intensity distribution either locally or in terms of a position in the orthogonal direction is determined as the image representation of the edge of the at least one second segment.

For instance, determining the one-dimensional intensity distribution of the image in the direction perpendicular to the plurality of determined edge candidates may also include an averaging over a plurality of pixels in a direction parallel to the plurality of determined edge candidates in order to increase a signal-to-noise ratio of the determined one-dimensional intensity distribution.

For instance, when determining the one-dimensional intensity distribution of the image, "perpendicular to the plurality of determined edge candidates" includes perpendicular to one, to some or to all of the plurality of determined edge candidates.

In the surroundings of the plurality of determined edge candidates, the one-dimensional intensity distribution comprises the first and the second region, which have different mean intensity values from one another. In other words, the plurality of determined edge candidates are flanked by a brighter region (second region) and a darker region (first region). Taking account of these regions allows for a better selection of the relevant edge from the plurality of edge candidates.

The first and the second regions of the one-dimensional intensity distribution correspond in particular to edge-free regions of the sample. In other words, the first and the second regions of the one-dimensional intensity distribution correspond in particular to regions of the sample for which no edge candidates were determined in step a).

For instance, the microstructured sample has a flat shape with a plane of main extent and a height direction arranged perpendicular to the plane of main extent. For instance, the microscopic image of the sample was recorded using an image recording device, the line-of-sight of which is arranged parallel to the height direction of the sample.

For instance, the at least one first segment of the sample has a first height in relation to the height direction of the sample. For instance, the at least one second segment of the sample has a second height, greater than the first height, in relation to the height direction of the sample. For instance, the edge of the at least one second segment comprises an edge wall. The edge wall can be arranged perpendicular to the plane of main extent of the sample and parallel to the height direction. However, the edge wall may also be arranged at an angle to the plane of main extent of the sample.

According to an embodiment, the first region of the one-dimensional intensity distribution of the image is based on an image representation of the at least one first segment of the sample, and the second region of the one-dimensional intensity distribution of the image is based on an image representation of the at least one second segment of the sample.

Hence, the edge candidate from among the plurality of determined edge candidates which is located closest to the darker region of the image, which corresponds to the lower-lying structure (the first segment) of the sample, in relation to the orthogonal direction is selected and consequently determined as the image representation of the edge of the second segment.

According to a further embodiment, the at least one first segment of the sample includes a first material, and the at least one second segment of the sample includes a second material that differs from the first material.

For instance, an exposed surface of the at least one first segment and an exposed surface of the at least one second segment have different materials from one another in particular.

According to a further embodiment, the second mean intensity value in the second region of the one-dimensional intensity distribution of the image is greater than the first mean intensity value in the first region of the one-dimensional intensity distribution of the image on account of the difference in materials between the at least one first and second segment of the sample.

Hence, in relation to the orthogonal direction, different materials of the sample, which are imaged with different brightnesses (intensity values) in the image, are located to the left and right of the plurality of determined edge candidates. Now, the different brightnesses (intensity values) caused by the different materials in the image are used to select the best edge candidate from among the plurality of edge candidates and in particular to reject artefacts.

For instance, the material difference between the at least one first and second segments of the sample is a material difference between (exposed) surfaces of the at least one first and second segments of the sample.

According to a further embodiment, the at least one first and second segments of the sample include the same material.

For instance, an exposed surface of the at least one first segment and an exposed surface of the at least one second segment have the same material in particular.

According to a further embodiment, the second mean intensity value in the second region of the one-dimensional intensity distribution of the image is less than the first mean intensity value in the first region of the one-dimensional intensity distribution of the image on account of a shadow formed adjacent to the edge of the at least one second segment of the sample.

As a result of the second segment forming a shadow, a region of the first segment adjacent to the second segment is imaged with lower brightnesses (smaller intensity values) in the image than the second segment. The different brightnesses (intensity values) between the second segment imaged in the image and the shadowed region of the first segment adjacent to the second segment, which are caused by the shadow formation, are now used to select the most suitable edge candidate from among the plurality of edge candidates.

In other words, the mean intensity value in the second region of the one-dimensional intensity distribution is greater than the mean intensity value in the shadowed region of the one-dimensional intensity distribution on account of the shadow formation.

According to a further embodiment, a predetermined threshold value is applied when determining the plurality of edge candidates on the basis of the gradient of the two-dimensional intensity distribution, in such a way that a corresponding edge candidate is determined for gradients of the two-dimensional intensity distribution whose absolute value is greater than the predetermined threshold value, and no edge candidate is determined for gradients of the two-dimensional intensity distribution whose absolute value is less than or equal to the predetermined threshold value.

By setting a low threshold value, it is also possible to capture edges that are imaged weakly in the image, although this increases the number of artefacts among the determined edge candidates. Setting a higher threshold value reduces the number of artefacts among the determined edge candidates, although edges that are imaged very weakly in the image might not be captured as a result.

According to a further embodiment, step a) is preceded by image preprocessing for reducing a noise component of the two-dimensional intensity distribution.

One or more suitable image smoothing process(es) can be applied within the scope of the image preprocessing for reducing a noise component. Exemplary suitable processes comprise binning, Gaussian filtering, low-pass filtering, etc. Merely by way of example, it is possible here for a plurality of mutually adjacent pixels (e.g. four or possibly more or fewer) to be replaced in each case by a single (e.g. average) pixel, wherein this pixel is then assigned the mean intensity value of the plurality of combined pixels.

According to a further embodiment, the microstructured sample is designed for an operating wavelength of less than 250 nm, of less than 200 nm, of less than 100 nm and/or of less than 15 nm, and/or the microstructured sample is a lithography mask, in particular an EUV or a DUV lithography mask, and/or a wafer structured by microlithography.

For instance, a DUV lithography mask is a transmissive photomask, in which a pattern to be imaged during lithography is realized in the form of an absorbent (i.e. opaque or partially opaque) coating (the coating corresponds to the second segment) on a transparent substrate (the transparent substrate corresponds to the first segment).

For instance, an EUV lithography mask is a reflective photomask, in which the pattern to be imaged is realized in the form of an absorbent coating (the coating corresponds to the second segment) on a reflecting substrate (the reflecting substrate corresponds to the first segment).

In particular, the lithography mask is used in a lithography apparatus. For example, the lithography apparatus is an EUV or a DUV lithography apparatus. EUV stands for "extreme ultraviolet" and refers to a wavelength of the working light in the range from 0.1 nm to 30 nm, in particular 13.5 nm. Furthermore, DUV stands for "deep ultraviolet" and refers to a wavelength of the working light between 30 nm and 250 nm.

The EUV or DUV lithography apparatus comprises an illumination system and a projection system. In particular, using the EUV or DUV lithography apparatus, the image of a lithography mask (reticle) illuminated by use of the illumination system is projected by use of the projection system onto a substrate, for instance a silicon wafer, which is coated with a light-sensitive layer (photoresist) and arranged in the image plane of the projection system, in order to transfer the mask structure to the light-sensitive coating of the substrate.

According to a further embodiment, the at least one first segment of the sample includes a light-transmitting or light-reflecting material, and the at least one second segment of the sample includes a light-absorbing material.

For instance, the materials are light-transmitting, light-reflecting or light-absorbing for light at a wavelength in the DUV and/or EUV range of the electromagnetic spectrum.

For instance, the at least one first segment of the sample includes a light-transmitting material if the sample is a DUV lithography mask (transmissive photomask, binary mask). For instance, the at least one first segment of the sample includes a light-reflecting material if the sample is an EUV lithography mask (reflective photomask).

For instance, the at least one first segment of the sample comprises a substrate. For instance, the substrate comprises silicon dioxide ($SiO_2$), e.g. fused quartz. For instance, the at least one first segment of the sample may also comprise one or more layers (coatings). The one or more layers comprise, e.g., one or more reflecting layers and/or one or more protection layers (e.g. Ru capping layer).

For example, the at least one second segment of the sample comprises an absorber structure. For instance, the at least one second segment of the sample includes chromium, chromium compounds, tantalum compounds and/or compounds of silicon, nitrogen, oxygen and/or molybdenum (e.g. molybdenum silicon oxide or molybdenum silicon oxynitride, i.e. silicon oxide or silicon nitride ($Si_3N_4$) which is doped with molybdenum (Mo) (e.g. approximately 5% molybdenum) and also referred to as MoSi).

The at least one second segment of the sample may also include the same material as the at least one first segment of the sample. In this case, the corresponding material may have been applied to a substrate of the sample with a greater thickness (i.e. greater height in relation to a height direction of the sample) in the second segment than in the first segment, in order to have the corresponding light-absorbing or light-transmitting/light-reflecting property. In particular, in this case a greater thickness (greater height) corresponds to a more strongly absorbent effect.

According to a further aspect, a computer program product is proposed, comprising instructions that, upon execution of the program by at least one computer, cause the latter to carry out the above-described method.

A computer program product, for example a computer program medium, can be provided or supplied, for example, as a storage medium, for example a memory card, a USB stick, a CD-ROM, a DVD, or else in the form of a downloadable file from a server in a network. By way of example, in a wireless communications network, this can be effected by transferring an appropriate file with the computer program product or the computer program means.

According to a further aspect, an apparatus is proposed for analyzing an image of a microlithographic microstructured sample. The sample comprises at least one first segment and at least one second segment which has an edge and is raised vis-à-vis the first segment. Moreover, the image includes a plurality of pixels and a two-dimensional intensity distribution depending on the pixels. Additionally, the apparatus comprises:

a first determination device for determining a plurality of edge candidates for an image representation of the edge of the at least one second segment on the basis of gradients of the two-dimensional intensity distribution, a second determination device for determining a one-dimensional intensity distribution of the image in a direction perpendicular to the plurality of edge candidates, wherein in said direction, the one-dimensional intensity distribution comprises a first region with a first mean intensity value, the plurality of edge candidates and a second region with a second mean intensity value greater than the first mean intensity value, and a third determination device for determining the edge candidate of the plurality of edge candidates which among the plurality of edge candidates is closest to the first region of the one-dimensional intensity distribution as the image representation of the edge of the at least one second segment.

In particular, the apparatus is configured to carry out a method as described above.

The above-described method and the above-described apparatus for analyzing an image of a microlithographic microstructured sample can be applied for edge detection and extraction (contour detection and extraction) in many different applications.

Examples of applications comprise the detection of defects on the sample (e.g. a size, position, (geometric) shape and contour of a defect and, in the case of defects having a plurality of segments within the meaning of several connected regions, the plurality of segments of the defect) by calculating the difference between structures of a defect-free reference and the structures (first and second segments) of the microstructured sample of the recorded microscopic image (pattern copy). The reference can be taken from a recorded microscopic image; the reference can be "empty" such that the segmentation of the defect should be equated to defect detection; the reference can be based on a microscopic image simulated by a design file; and/or the reference can be based on a change in contour of the sample structures (e.g. photomask structures) calculated on the basis of a model and produced physically in order to establish a correct exposure behaviour of the photomask during wafer exposure, the incorrectness of which consisted in an otherwise inaccessible cause.

Examples of applications of the above-described method also comprise the detection of what is known as an opaque defect, i.e. excess absorber material in comparison with the intended state of the sample (e.g. lithography mask), and the detection of what is known as a clear defect, i.e. a lack of absorber material in comparison with the intended state of the sample (e.g. lithography mask). Further, a particle (e.g. foreign body) can also be identified as a defect using the proposed method. Moreover, it is possible to determine repair shapes and/or processing shapes (i.e. geometric shapes, e.g. two-dimensional geometric shapes, which label a region in which the sample needs to be repaired and/or processed). The repair shapes and/or processing shapes, e.g., comprise polish processing shapes which label a region in which the sample needs to be polished. For example, the polish processing shapes are used for fine processing of the edges or residues. This also includes what is known as line trimming for the slight correction of the edge positions of a structure on the mask. These polish processing shapes can be identified and/or created with the aid of the method. The repair shapes and/or processing shapes, e.g., comprise repair shapes/processing shapes which label a region in which a deposit was deposited on the sample in a halo around a repair site and must be removed again. The repair shapes and/or processing shapes comprise, e.g., regions in opaque good structures that need to be etched away, whereby inaccessible errors in clear areas can be compensated.

In applications of the above-described method, the detection of defects can be used as an independent product solution or as a procedural step of a manual or automated workflow. Furthermore, a defect can be classified according to type, size and further parameters. This can be used as an independent product solution or as a procedural step of a manual or automated workflow (defect classification). In applications of the above-described method, a defect can be positioned automatically at a defined location in the image (e.g. in the image center). This can be used as an independent product solution or as a procedural step of a manual or automated workflow (defect centration, defect positioning).

Further examples of applications of the above-described method comprise the recognition and optional measurement of structures, e.g. the measurement of the edge spacings of the segments, in a recorded microscopic image. This can be used as an independent product solution or as a procedural step of a manual or automated workflow. Moreover, the edge spacings of the segments in a recorded microscopic image (SEM image) can be compared to the segments of a reference image. This can be used as an independent product solution or as a procedural step of a manual or automated workflow. What holds true in both cases is that, firstly, the SEM image may have been taken of any desired location on a photolithography mask and, e.g., may comprise an already treated/repaired defect or an (e.g. still entirely) untreated defect and that, secondly, the reference image may be a recorded SEM image or an SEM image that was simulated from a design file.

Further applications of the above-described method comprise the use of the detection of the segments in an SEM image of a photolithography mask for the purpose of modelling the three-dimensional construction of the different structures or levels of the photography mask. This can be used as an independent product solution or as a procedural step of a manual or automated workflow.

Further applications of the above-described method comprise the use of the detection of the segments in an SEM image of a photolithography mask for the purpose of simulating the optical aerial image of the photolithography mask created in the lithography process. This can be used as an independent product solution or as a procedural step of a manual or automated workflow. Moreover, segments can be detected at different positions of the photolithography mask in the recorded SEM images for the purpose of determining the spacing and the absolute position of the structures. This can be used as an independent product solution or as a procedural step of a manual or automated workflow. Moreover, segments can also be detected in an SEM image of a photolithography mask for the purpose of comparison with an image of the same structure created by a different source and with the object of a positional comparison (image registration, position comparison, position calibration).

Further examples of applications of the above-described method comprise the detection of segments in an SEM image for the purpose of a suitable placement of drift correction markers under the given boundary conditions (e.g. deposition only on absorber material, minimum distance from the defect, minimum distance from the closest structure edge, maximally symmetric distribution) and for the purpose of automatic drift correction. It is also possible to detect segments in an SEM image which are suitable for beam optimization (e.g. focusing, de-stigmatization, stop alignment). Moreover, an automatism can be provided, which recognizes whether a defined structure is present in the image field and which for instance outputs a warning automatically if this structure has disappeared from the visual field. A further application lies in the recognition of structures in an SEM image as a searching aid for the purpose of finding target structures situated outside of the visual field (automatic global alignment). Using the above-described method, it is also possible to detect segments of hardware attached to an electron column, in order to align the electron beam emerging from the electron column in relation to this hardware.

The above-described examples of applications can be used in apparatuses for mask repair and/or mask processing, and as individual products.

"A (n)" should not necessarily be understood as a restriction to exactly one element in the present case. Rather, a plurality of elements, such as two, three or more, may also be provided. Nor should any other numeral used here be understood to the effect that there is a restriction to exactly the stated number of elements. Rather, unless indicated otherwise, numerical deviations upwards and downwards are possible.

The embodiments and features described for the method apply correspondingly to the proposed apparatus, and vice versa.

Further possible implementations of the invention also comprise non-explicitly mentioned combinations of features or embodiments described previously or hereinafter with regard to the exemplary embodiments. In this case, a person skilled in the art will also add individual aspects as improvements or supplementations to the respective basic form of the invention.

Further advantageous configurations and aspects of the invention are the subject of the dependent claims and also of the exemplary embodiments of the invention that are described hereinafter. The invention is explained in greater detail hereinafter on the basis of preferred embodiments with reference to the accompanying figures.

DETAILED DESCRIPTION

Unless indicated otherwise, elements that are identical or functionally identical have been provided with the same reference signs in the figures. Furthermore, it should be noted that the illustrations in the figures are not necessarily true to scale.

Below, FIGS. 1 to 10 are used to describe a method for analyzing a microlithographic microstructured sample 100, in particular an image 300 of a microlithographic microstructured sample 100.

Figure 1:
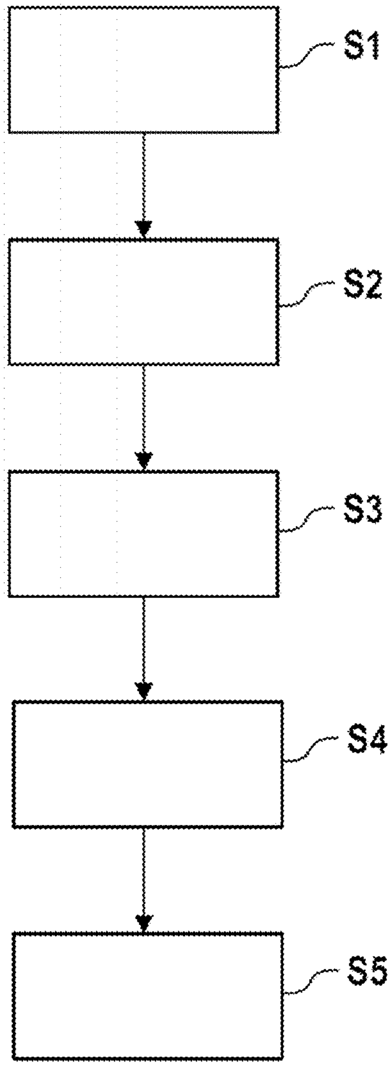
FIG. 1 shows a flowchart of a method for analyzing an image of a microlithographic microstructured sample according to an embodiment.
Figure 2:
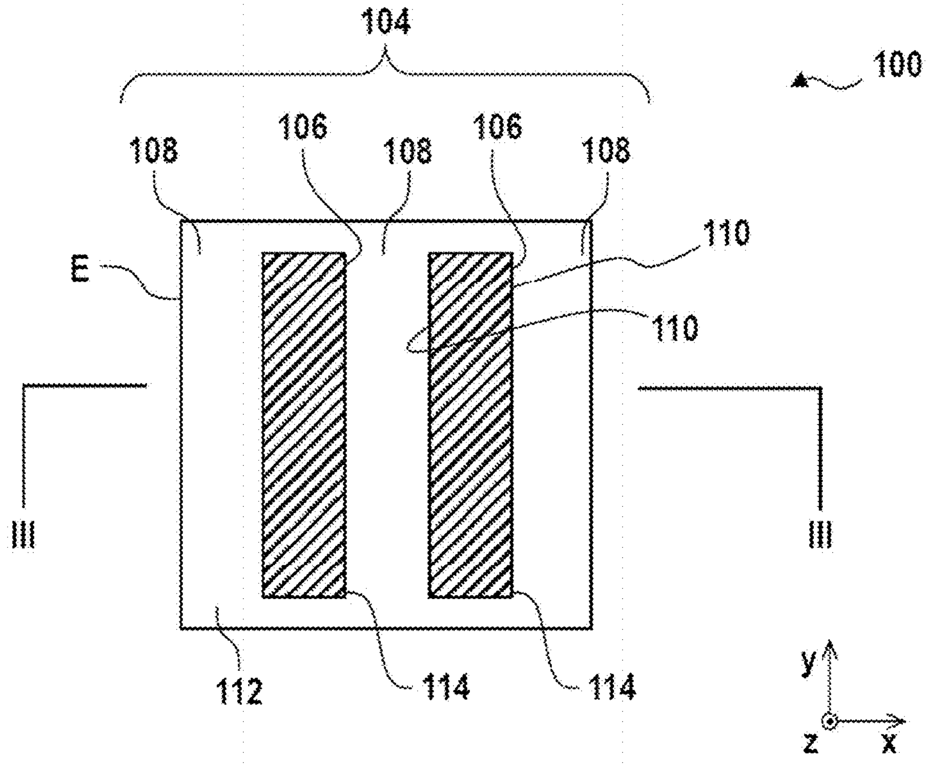
FIG. 2 shows a plan view of a detail of a microstructured sample according to an embodiment.
Figure 3:
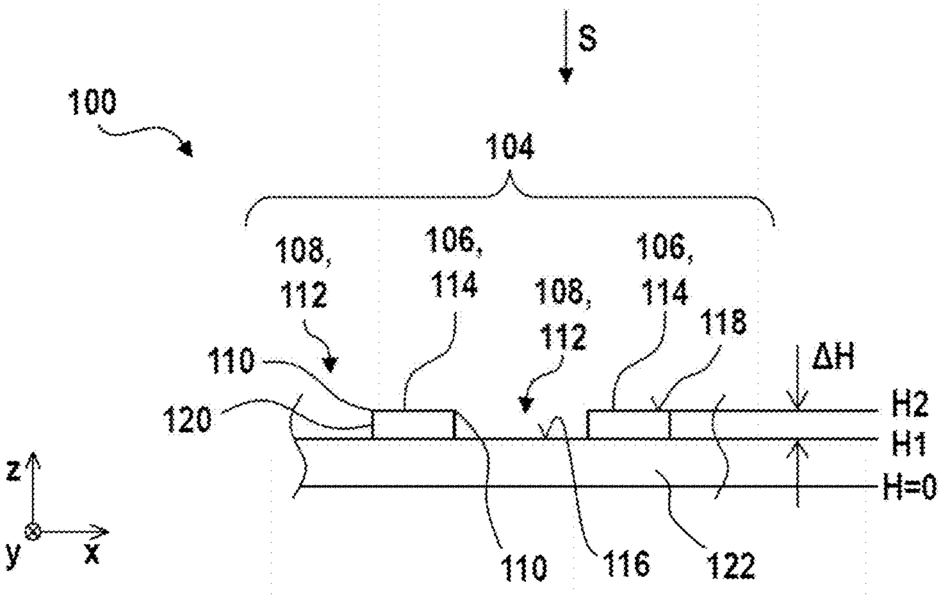
FIG. 3 shows a cross section from FIG. 2 along the line III-III.

FIG. 2 shows a detail of an exemplary microstructured sample 100. FIG. 3 shows the detail of the sample 100 shown in FIG. 2 in a cross-sectional view along line III-III in FIG. 2. The sample 100 comprises a microstructure 104. For example, the microstructure 104 comprises one or more raised elements 106 (e.g. absorber structures 106) and adjacent lower areas 108. For instance, the microstructure 104 comprises one or more raised elements 106 with lower areas 108 (e.g. trenches 108) therebetween. The raised elements 106 have edges 110, two of which are provided with a reference sign in FIG. 2. The lower areas 108 comprise one or more first segments 112 in particular. Furthermore, the raised elements 106 comprise one or more second segments 114, which are raised vis-à-vis the one or more first segments 112. FIG. 2 only shows two second segments 114 by way of example.

Moreover, the microstructured sample 100 has, for instance, a flat shape with a main plane of extent E (xy-plane in FIGS. 2 and 3). A direction perpendicular to the main plane of extent E is referred to as a height direction z of the sample 100.

For example, each of the second segments 114 in FIG. 2 is a connected region in a plane parallel to the main plane of extent E of the sample 100.

As shown in the cross section in FIG. 3, the at least one first segment 112 of the sample 100 has a first height H1 in relation to the height direction z of the sample 100. Moreover, the at least one second segment 114 of the sample 100 has a second height H2, greater than the first height H1, in relation to the height direction z. In particular, the at least one second segment 114 rises to a height ΔH above a surface 116 of the at least one first segment 112. In other words, a surface 118 of the at least one second segment is arranged a height ΔH above the surface 116 of the at least one first segment 112.

The edges 110 of the at least one second segment 114 each have an edge wall 120 in particular (FIG. 3). For instance, the corresponding edge wall 120 is arranged parallel to the height direction z of the sample 100 and perpendicular to the plane of main extent E (FIG. 2) of the sample 100 (i.e. at a 90° angle to the plane of main extent E). In FIG. 3, an edge wall 120 is located in the yz-plane by way of example. However, in other examples, the edge wall 120 may also be arranged at an incline to the main plane of extent E of the sample 100 (i.e. at an angle less than or greater than 90° to the main plane of extent E) or else be located in the xz-plane or in any other plane arranged perpendicular to the main plane of extent E.

For instance, the sample 100 has a substrate 122 (FIG. 3), on which the one or more raised elements 106, which form the at least one second segment 114, are arranged. An exposed surface of the substrate 122 for example forms the surface 116 of the at least one first segment 112.

Although not shown in the figures, one or more layers (coatings) can also be arranged on the substrate 122 of the sample 100. For instance, if the sample 100 is an EUV lithography mask, then e.g. a protection layer, for example a Ru capping layer, can be arranged on the substrate 122. Should one or more layers be arranged on the substrate 122, exposed regions of an uppermost layer of these one or more layers may form the surface 116 of the at least one first segment 112.

The lower areas 108, e.g. the substrate 122, and the one or more raised elements 106 of the sample 100 may include different materials from one another or else include the same material. In other words, the at least one first segment 114 and the at least one second segment 114 may have different materials from one another or else the same material. For example, the exposed surface 116 of the at least one first segment 114 and the exposed surface 118 of the at least one second segment 114 may have different materials from one another or else the same material.

Furthermore, the at least one first segment 112 of the sample 100 can include a light-transmitting or light-reflecting material, and the at least one second segment 114 of the sample 100 can include a light-absorbing material.

In order to analyze the sample 100 and process and/or use it on the basis of the analysis, it may be necessary to detect contours of the microstructures 104, i.e. for example the edges 110 of the second raised segments 114. For example, it might be necessary to determine a position and/or a (e.g. two-dimensional) geometric shape of the edges 110 of the second segments 114. This is performed using the method described below, which is based on an image analysis.

For example, the microstructured sample 100 analyzed in the method is a lithography mask (reticle), in particular an EUV or a DUV lithography mask. However, the microstructured sample 100 analyzed in the method can also be, for example, a wafer structured by use of microlithography or any other type of microstructured sample.

For example, the microstructured sample 100 analyzed in the method is configured for an operating wavelength in the DUV and/or EUV range. For example, the microstructured sample 100 is designed for an operating wavelength of less than 250 nm, less than 200 nm, and/or less than 15 nm. However, the microstructured sample 100 analyzed in the method can also be configured for an operating wavelength in other regions of the electromagnetic spectrum, or else not be configured for an exposure to working light.

In a first step S1 of the method, a microscopically captured image 300 (FIG. 5) of the sample 100 (e.g. part of the sample 100) is provided.

For instance, the microscopically captured image 300 is recorded by an image recording device 200 (FIG. 4), which creates an image 300 with the aid of a particle beam, for example an electron beam 202 or an ion beam.

Figure 4:
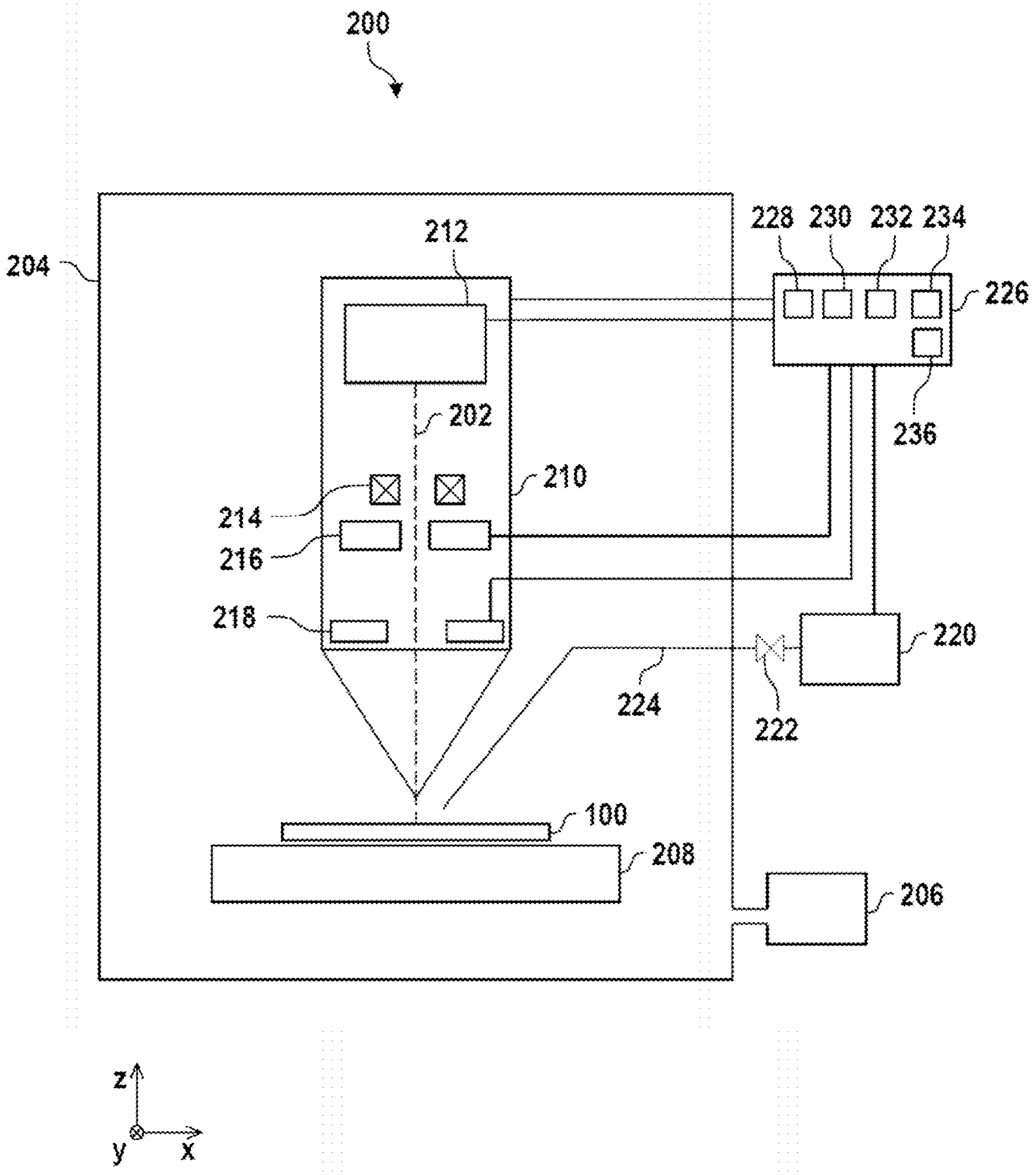
FIG. 4 shows an apparatus for recording a microscopic image of a microstructured sample according to an embodiment.

A scanning electron microscope 200 is shown merely by way of example in FIG. 4 as an example of an image recording device 200. FIG. 4 schematically illustrates a section through a few components of the apparatus 200 which can be used for imaging the sample 100.

Moreover, the apparatus 200 can optionally also be used for electron beam-induced processing and/or repairing (e.g. etching, depositing) of the sample 100. For instance, the apparatus 200 is a repair apparatus (repair tool) for microlithographic photomasks, for example for photomasks for a DUV or EUV lithography apparatus.

The apparatus 200 shown in FIG. 4 represents, e.g., a modified scanning electron microscope 200. In this case, an electron beam 202 is used to image the sample 100. The apparatus 200 is largely arranged in a vacuum housing 204. A space enclosed by the vacuum housing 204 is kept at a certain gas pressure by a vacuum pump 206.

The sample 100 to be processed is arranged on a sample stage 208. For instance, the sample stage 208 is configured to set the position of the sample 100 in three mutually orthogonal spatial directions x, y, z and, for instance, additionally in three mutually orthogonal axes of rotation with an accuracy of a few nanometres.

The apparatus 200 comprises an electron column 210. The electron column 210 comprises an electron source 212 for providing the electron beam 202. The electron column 210 also comprises electron or beam optics 214. The electron source 212 creates the electron beam 202 and the electron or beam optics 214 focus the electron beam 202 and direct the latter to the sample 100 at the output of the column 210. The electron column 210 also comprises a deflection unit 216 (scanning unit 216) configured to guide (scan) the electron beam 202 over the surface of the sample 100. Instead of the deflection unit 216 (scanning unit 216) arranged within the column 210, use can also be made of—not shown—a deflection unit (scanning unit) arranged outside of the column 210.

The apparatus 200 also comprises a detector 218 for detecting the secondary electrons and/or backscattered electrons produced in the material of the sample 100 by the incident electron beam 202. For instance, as shown, the detector 218 is arranged around the electron beam 202 in ring-shaped fashion within the electron column 210. As an alternative and/or in addition to the detector 218, the apparatus 200 may also comprise other/further detectors for detecting secondary electrons and/or backscattered electrons (not shown in FIG. 4).

The apparatus 200 may optionally also comprise a gas provision unit 220 for supplying process gas to the surface of the sample 100. For instance, the gas provision unit 220 comprises a valve 222 and a gas line 224. The electron beam 202 directed at a location on the surface of the sample 100 by the electron column 210 can carry out electron-beam induced processing (EBIP) in conjunction with the process gas supplied by the gas provision unit 220 from the outside via the valve 222 and the gas line 224. In particular, said process comprises a deposition (depositing) and/or an etching of material.

The apparatus 200 also comprises a computing apparatus 226, for example a computer, having a control device 228, a production device 230, a first determination device 232, a second determination device 234 and a third determination device 236. In the example of FIG. 4, the computing apparatus 226 is arranged outside of the vacuum housing 204.

The control device 228 serves, e.g., for controlling the apparatus 200. For instance, the control device 228 controls the provision of the electron beam 202 by controlling the electron column 210. In this case, the control device 228 inter alia controls the guidance of the electron beam 202 over the surface of the sample 100 by controlling the scanning unit 216. The control unit 228 can also control the gas provision unit 220 for providing process gas.

The production device 230 receives measurement data from the detector 218 and/or other detectors of the apparatus 200 and creates images 300, 500 (FIGS. 5, 9) which can be displayed on a monitor (not shown) from the measurement data. For instance, a spatial resolution of the produced images 300, 500 is of the order of a few nanometers.

Figure 5:
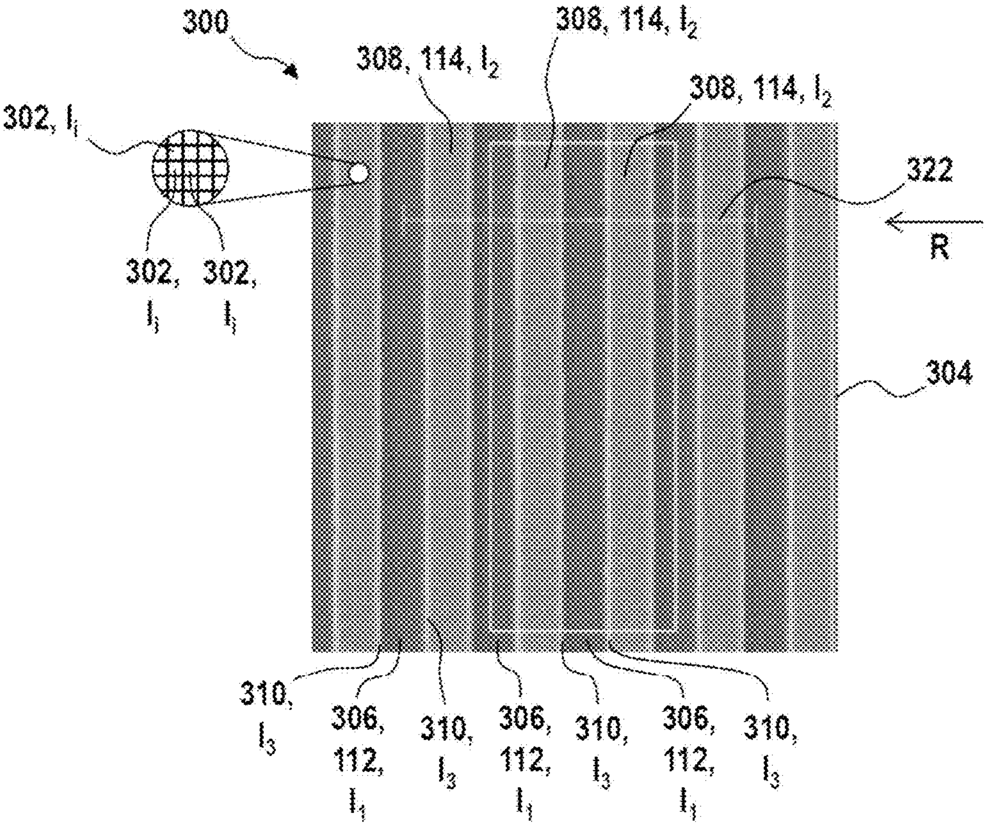
FIG. 5 shows an image, recorded by the apparatus from FIG. 4, of a microstructured sample according to an embodiment.

FIG. 5 shows an example of a microscopically captured image 300 of a sample, similar to the sample 100 in FIG. 2. For example, the image 300 has been captured using the scanning electron microscope 200 from FIG. 4. Thus, the image 300 is a scanning electron microscope image (SEM image), for example.

For example, the image 300 has been recorded along a line-of-sight S (FIG. 3) arranged parallel to the height direction z of the sample 100.

The image 300 includes a multiplicity of pixels 302 (a number n of pixels), three of which have been provided with a reference sign in an enlarged partial detail in FIG. 5 by way of example. For example, the image 300 includes a number n of pixels 302, where n is a natural number greater than one. In particular, the pixels 302 are arranged in a two-dimensional arrangement. The image 300 also includes an intensity value $I_i$ ("greyscale value"), with i=1 to n, assigned to each i-th pixel 302. The intensity values $I_i$ of the n pixels 302 form a two-dimensional intensity distribution 304 of the image 300.

By way of example, the image 300 in FIG. 5 shows darker and brighter regions 306, 308 with different intensities $I_1$, $I_2$. In particular, the at least one first segment 112 of the sample 100 (FIG. 2) is imaged in a first region 306 or in first regions 306 in the image 300, for instance with a lower intensity $I_1$ (i.e. imaged darker). Furthermore, for instance, the at least one second segment 114 of the sample 100 (FIG. 2) is imaged in a second region 308 or in second regions 308 in the image 300 with a greater intensity $I_2$ (i.e. imaged brighter). In the example of FIG. 5, $I_2$ thus is greater than $I_1$ (see also FIGS. 6 and 7).

In other examples (FIGS. 10 and 11), however, the at least one first segment 112 and the at least one second segment 114 of the sample 100 (FIG. 2) can for instance also be imaged-apart from shadowing and/or edge brightening—with (e.g. approximately) the same mean intensity $I_1'$, $I_2'$ (i.e. $I_1'=I_2'$ or $I_1'\approx I_2'$).

So-called edge brightening 310 may occur when imaging the edges 110 (FIG. 2) of the at least one second raised segment 114 in the image 300 (FIG. 5), as visible in FIG. 5. In the region of this edge brightening 310, an intensity $I_3$, $I_3'$ of the image 300 is greater than in each of the first and the second region 306, 308 (see also FIG. 7).

In an optional second step S2 of the method, image preprocessing is performed in order to reduce a noise component of the two-dimensional intensity distribution 304 (FIG. 5).

In a third step S3 of the method, a plurality of candidates 312, 314 (FIG. 7) for an image representation of an edge 110 (FIG. 2) of the second segment 114 are determined on the basis of the image 300. This is implemented on the basis of a calculation of gradients 316, 318 (i.e. first derivatives 316, 318) of the two-dimensional intensity distribution 304 (FIG. 5) in the image 300.

Each edge candidate 312, 314 corresponds to a possible image representation of one and the same real edge 110 of the second segment 114 of the sample 100. In other words, more than one candidate for an image representation of the edge 110 is found for one and the same edge 110 of the second segment 114 of the sample 100 when the gradients 316, 318 of the image 300 in the sample 100 are calculated.

For example, the plurality of edge candidates 312, 314 are determined by the first determination device 232 of the apparatus 200 (FIG. 4).

Figure 6:
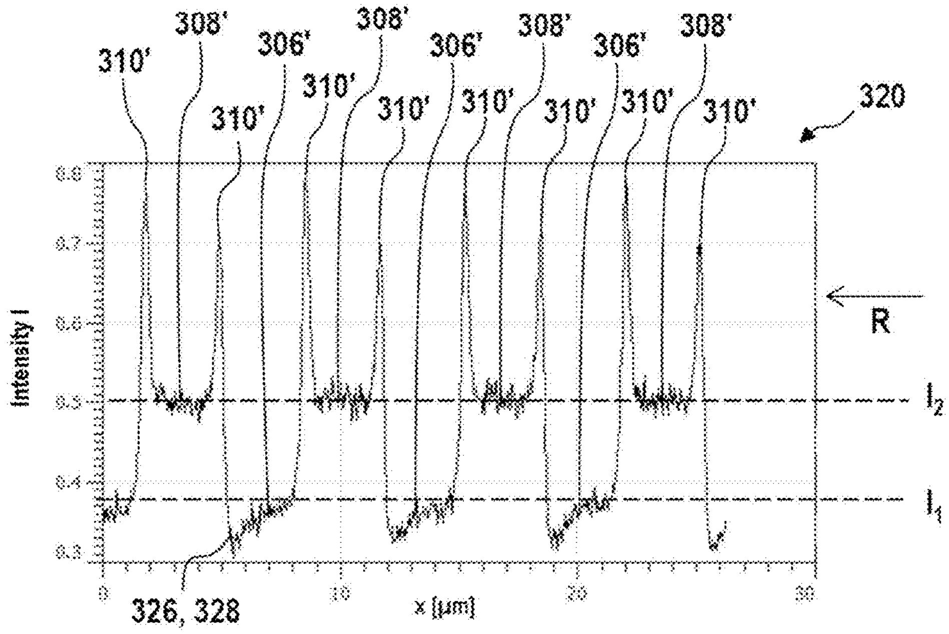
FIG. 6 shows a one-dimensional intensity distribution of the image shown in FIG. 5.
Figure 7:
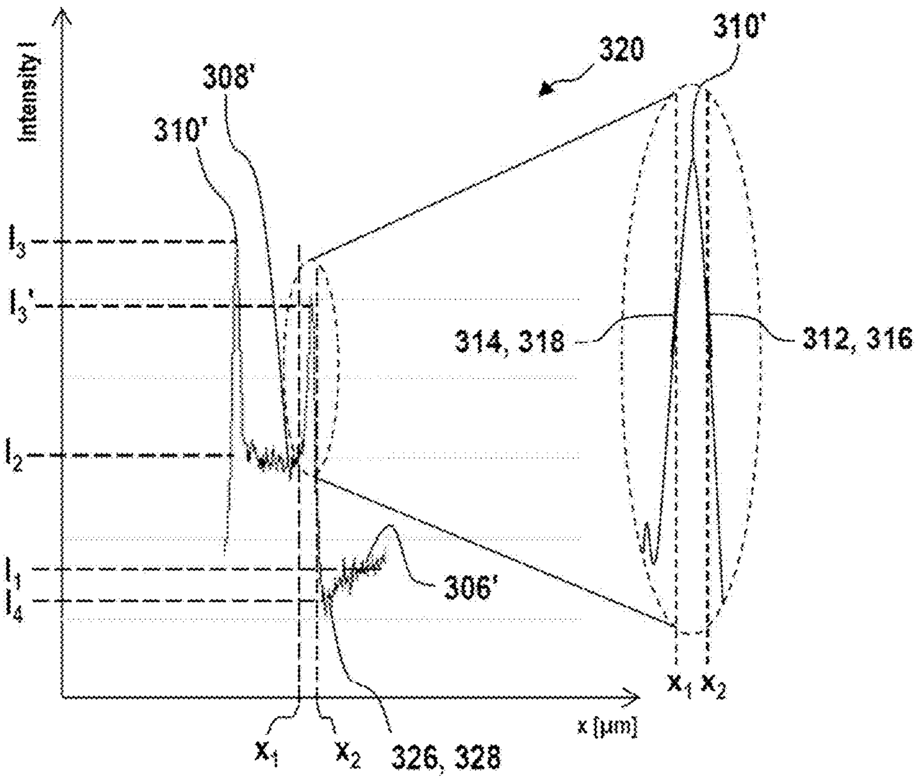
FIG. 7 shows a magnified partial detail of the intensity distribution from FIG. 6.

It is noted that the figures, in particular FIG. 7, only show gradients 316, 318 of a one-dimensional intensity distribution 320 (FIG. 6) for reasons of clarity. Nevertheless, the gradient formation in step S3 is preferably implemented as a determination of gradients in the two-dimensional intensity distribution 304 (FIG. 5) of the image 300.

For example, the edge candidates 312, 314 (FIG. 7) are determined by applying what is known as a Sobel operator and/or else any other suitable process to the two-dimensional intensity distribution 304 (FIG. 5) of the image 300. For instance, a gradient 316, 318 of the intensity distribution 304 is determined for each pixel 302 in the image 300 on the basis of intensity values $I_i$ of the corresponding pixel 302 and the pixels 302 surrounding this pixel 302. Thus, a matrix of gradients 316, 318, for example, is derived from the image 300. Then, candidates 312, 314 for edges 110 (FIG. 2) of the at least one second segment 114 captured in the image 300 are determined at those pixels 302 at which the intensity I (i.e. brightness) of the original image 300 changes to the greatest extent (corresponding to a large gradient).

In a fourth step S4 of the method, a one-dimensional intensity distribution 320 (FIG. 7) of the image 300 is determined in a direction R (FIG. 5) perpendicular to the plurality of edge candidates 312.

For example, the one-dimensional intensity distribution 320 is determined by the second determination device 234 of the apparatus 200 (FIG. 4).

FIG. 6 shows an example of a one-dimensional intensity distribution 320 in the image 300 in the direction R perpendicular to the plurality of edge candidates 312, 314. In particular, FIG. 6 shows the intensity distribution 320 in the image 300 along the line 322 in FIG. 5. FIG. 6 shows, in particular, a graph of the one-dimensional intensity distribution 320 in the image 300 as a function of a location x in the direction R. In the example shown, the orthogonal direction R is parallel to the x-direction of the image (FIG. 5), and hence the intensity distribution 320 in FIG. 6 is shown as a function of an x-coordinate of the image 300.

In the example of FIG. 6, the one-dimensional intensity distribution 320 includes first regions 306' which have a first mean intensity value $I_1$ and which correspond to the darker regions 306 in FIG. 5 and hence correspond to an image representation of the first segments 112 of the sample 100. The one-dimensional intensity distribution 320 also includes second regions 308' which have a second mean intensity value $I_2$ and which correspond to the brighter regions 308 in FIG. 5 and hence correspond to an image representation of the second segments 114 of the sample 100. In particular, the second mean intensity value $I_2$ is greater than the first mean intensity value $I_1$. Moreover, the edge brightenings 310 at the edges 110 of the second segments 114 appear as maxima 310' in the intensity distribution 320 of FIG. 6.

FIG. 7 shows a magnified portion of the one-dimensional intensity distribution 320 from FIG. 6.

The edge brightenings 310 (FIG. 5) in the region of the image representation of the edges 110 (FIG. 2) appear as maxima 310' in the one-dimensional intensity distribution 320 (FIGS. 6 and 7). On account of the edge brightening 310, two gradients 316, 318 with a large absolute value are determined at the flanks of the respective maximum 310', i.e. at two different positions $x_1$, $x_2$, in the region of the image representation of a respective edge 110. Consequently, two candidates 312, 314 are determined for an image representation of a respective edge 110. In other words, two different possible positions $x_1$, $x_2$ (FIG. 7) are determined for a respective edge 110 in the direction R (FIG. 5). In an example in which the orthogonal direction R is parallel to the x-direction of the image 300, two possible x-positions $x_1$, $x_2$, for example, are determined for the edge 110.

Figure 8:
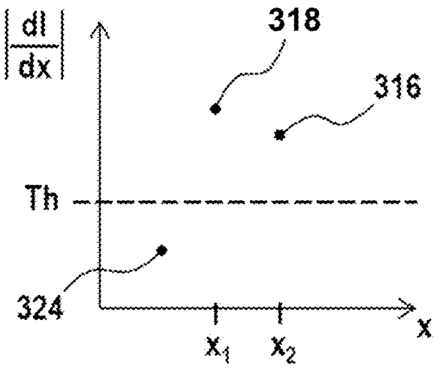
FIG. 8 shows a diagram of a gradient of the intensity distribution from FIG. 7 according to an embodiment.

Optionally, a predetermined threshold value Th can be applied during the determination of the plurality of (e.g. parallel) edge candidates 312, 314 (FIG. 7) for an image representation of an edge 110 of the second segment 114 based on the gradients 316, 318 in the two-dimensional intensity distribution 304 in step S4. This is illustrated in FIG. 8 for the one-dimensional case. In particular, FIG. 8 shows a diagram of an absolute value of a gradient (absolute value of the first derivative dI/dx) of the intensity distribution I from FIG. 7 as a function of location x. For example, the method may provide for only gradients 316, 318 of the two-dimensional intensity distribution 304 in step S4 whose absolute value is greater than the predetermined threshold value Th to be determined as edge candidates 312, 314. By contrast, gradients 324 (FIG. 8) of the two-dimensional intensity distribution 304 with an absolute value smaller than the predetermined threshold value Th are for example not classified as edge candidates 312, 314.

When imaging the sample 100, a shadow 326 (FIG. 6) that is visible in the image 300 of sample 100 might also be formed. In particular, a shadow 326 of the second segment 114 (FIGS. 2 and 3) may be formed in a region of the first segment 112 adjacent to the second segment 114. The shadow 326 leads to a shadowed region 328 in the image 300 and in the one-dimensional intensity distribution 320. It is noted that the shadowed region 328 is only visible in FIGS. 6 and 7 of the drawings. In other words, the shadow 326 leads to the at least one first segment 112 of the sample 100 (FIG. 2) being imaged with a lower mean intensity $I_4$ (FIG. 7) within the shadowed region 328 than outside of the shadowed region 328 (i.e. in the region of 306' in FIG. 7).

The intensity difference between the second region 308' and the first region 306' ($I_2 - I_1$) and/or the intensity difference between the second region 308' and the shadowed region 328 ($I_2 - I_4$) can be used in the next step of the method for the purpose of selecting one of the determined candidates 312, 314 as the image representation of the edge 110 of the second segment 114.

In a fifth step S5 of the method, the edge candidate of the plurality of edge candidates 312, 314 (FIG. 7) which among the plurality of edge candidates 312, 314 is located closest to the first region 306' and/or the shadowed region 328 of the one-dimensional intensity distribution 320 is determined as the image representation of the edge 110 (FIG. 2) of the second segment 114.

For example, the best edge candidate 312, 314 for an image representation of the edge 110 is determined in step S5 by the third determination device 236 of the apparatus 200 (FIG. 4).

In the example of FIG. 7, the edge candidate 312 from the two edge candidates 312, 314 determined in step S4 is located closest to the first region 306' of the one-dimensional intensity distribution 320 and is consequently determined as the image representation of the edge 110 of the second segment 114. For instance, a position $x_2$ of the edge candidate 312 is determined as the position of the edge 110 of the second segment 114.

In addition to that or in an alternative, step S5 can also consider that, of the two edge candidates 312, 314 determined in step S4, the edge candidate 312 is located closest to the shadowed region 328 in the one-dimensional intensity distribution 320. In this context, the same edge candidate 312 is determined as the image representation of the edge 110 of the second segment 114 in the example of FIG. 7.

The proposed method allows for better detection of the pose or position of edges 110 of the microstructured sample 100 (FIG. 2). In particular, the positions of the edges 110 determined by the proposed method are placed against the geometric shape of the at least one second segment 114 with greater accuracy in every detail and more precision in their positioning. Moreover, an edge position can be determined which, in comparison with conventional methods, is located closer in the direction of the lower-lying structure 108, 112 (FIG. 2).

Figure 9:
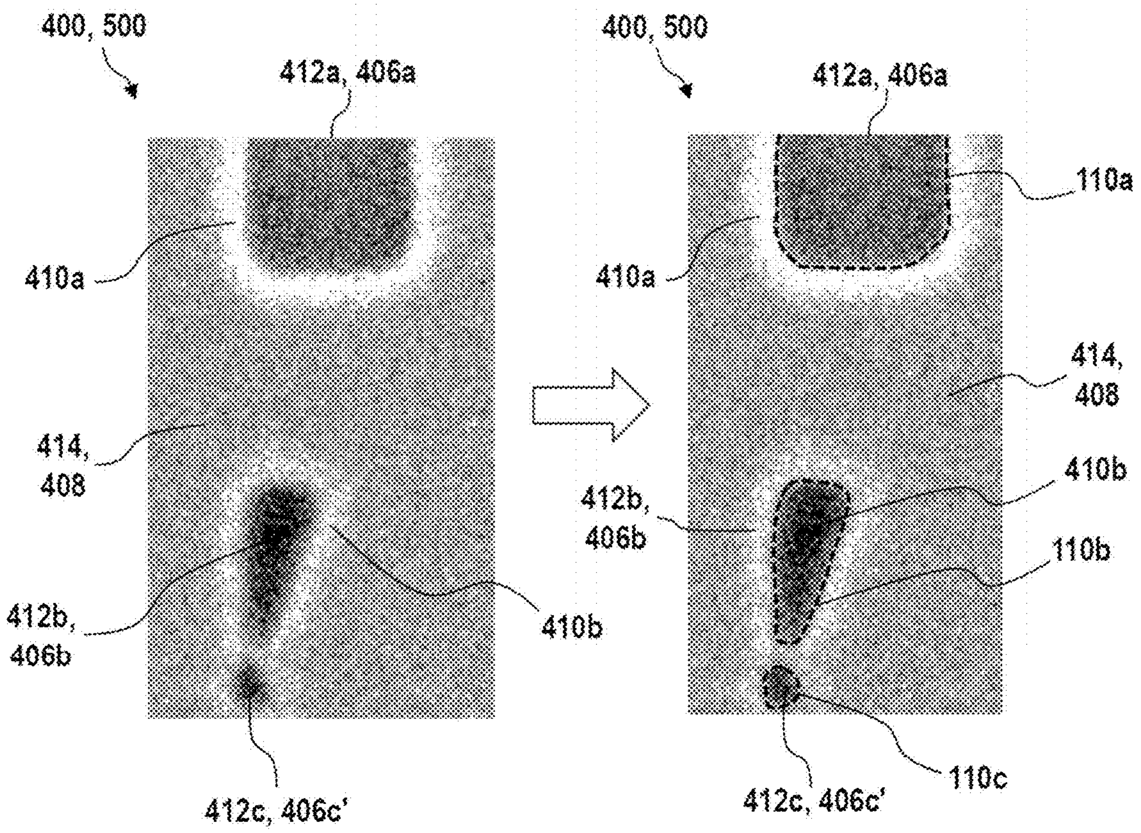
FIG. 9 shows a further microscopic image of a microstructured sample before and after a detection of segment edges according to an embodiment.

FIG. 9 illustrates a further example of the method for analyzing a sample 400 similar to the sample 100 in FIG. 2. FIG. 9 shows an image 500 (e.g. SEM image 500) of the sample 400 before (left figure) and after (right figure) an edge detection. The sample 400 includes at least three first segments 412*a*, 412*b*, 412*c* (similar to the first segment 112 in FIG. 2) and at least one second segment 414 (similar to the second segment 114 in FIG. 2). In the image 500, the first segments 412*a*, 412*b*, 412*c* of the sample 400 are imaged as first regions 406*a*, 406*b*, 406*c*. In this case, the first regions 406*a*, 406*b* each exhibit an edge brightening 410*a*, 410*b* similar to the edge brightening 310 in FIG. 5. However, the first region 406*c* exhibits only a very weak, or no, edge brightening. Furthermore, the second segment 414 of the sample 400 is imaged in the image 500 as second region 408.

As a result of the method described above, edges 110*a*, 110*b*, 110*c* of the first regions 406*a*, 406*b*, 406*c* corresponding to the first segments 412*a*, 412*b*, 412*c* can be detected positionally precisely, as illustrated to the right in FIG. 9. In particular, the edges 110*a*, 110*b*, 110*c* determined thus are located closer to the lower-lying structures 412*a*, 412*b*, 412*c* of the sample 400.

Figure 10:
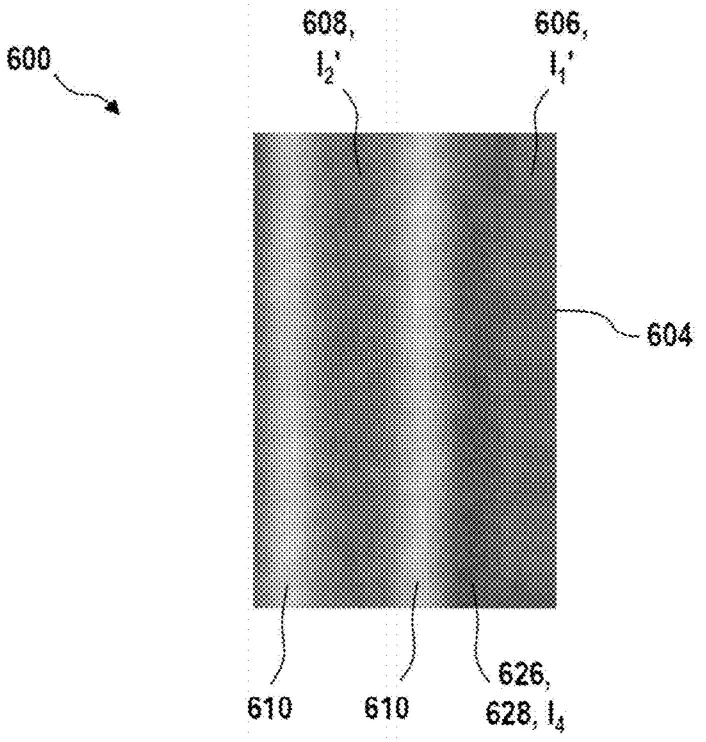
FIG. 10 shows a further image of a microstructured sample according to an embodiment, with the use of a shadow for detecting edges according to an embodiment being illustrated.
Figure 11:
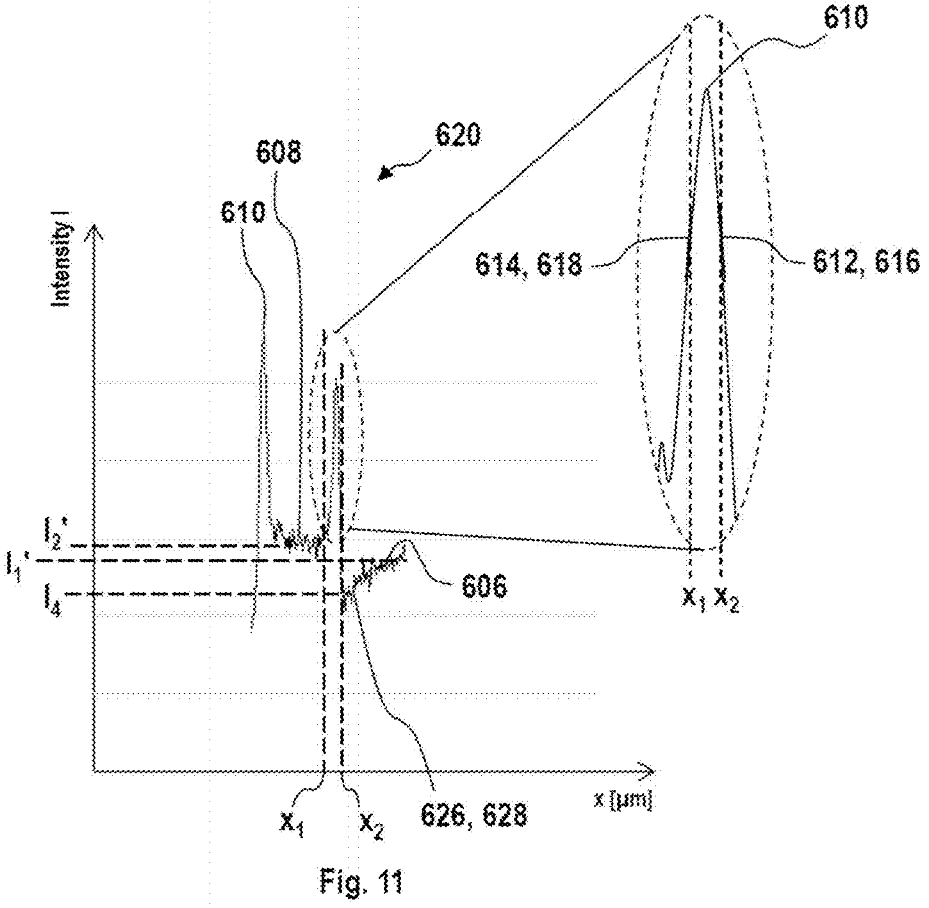
FIG. 11 shows a one-dimensional intensity distribution of the image shown in FIG. 10.

Should a shadow 326, 626 be formed when the sample 100 is imaged (FIGS. 7, 10 and 11), the shadowed region 328, 628 of the one-dimensional intensity distribution 320, 620 can be used in step S5—in place of the first region 306' of the one-dimensional intensity distribution 320—for the purpose of making a selection from the edge candidates 312, 314 (FIG. 7) or 612, 614 (FIG. 11). In other words, in step S5, the edge candidate 312 or 612 of the two determined edge candidates 312, 314 (FIG. 7) or 612, 614 (FIG. 11) which is located closest to the shadowed region 328, 628 of the one-dimensional intensity distribution 320, 620 can be determined as image representation of the edge 110 of the second segment 114 (FIG. 2).

Taking account of a shadow 326 formation was found to be advantageous, in particular, in the case where the at least one first and second segment 112, 114 include the same material and—apart from shadowing—are imaged in the image 300, 600 with the same mean brightness $I_1'$, $I_2'$.

FIG. 10 shows a further image 600 of a microstructured sample 100 according to an embodiment, which was recorded by the apparatus from FIG. 4, wherein the use of shadowing for edge detection is illustrated.

FIG. 11 shows a one-dimensional intensity distribution 620 of the image 600 shown in FIG. 10. In this case, the at least one first segment 112 and the at least one second segment 114 of the sample 100 (FIG. 2) are imaged-apart from a shadow 626, 628 and an edge brightening 610—with approximately the same mean intensity $I_{1'}$, $I_2'$ (FIG. 11) in the image 600 (i.e. $I_1' \approx I_2'$).

FIG. 11 plots, in particular, the edge candidates 612, 614 and gradients 616, 618, determined in step S4 on the basis of the two-dimensional intensity distribution 604 (FIG. 10), in a one-dimensional intensity distribution 620. A first region 606 with a first mean intensity $I_1'$ of the one-dimensional intensity distribution 620 corresponds to an image representation of the at least one first segment 112 of the sample 100. A second region 608 with a second mean intensity $I_2'$ of the one-dimensional intensity distribution 620 corresponds to an image representation of the at least one second segment 114. Moreover, a shadowed region 628 with a further mean intensity $I_4$ corresponds to an image representation of the shadowed region 628 of the at least one first segment 112.

In particular, the mean intensity value $I_2'$ in the second region 608 of the one-dimensional intensity distribution 620 is greater than the mean intensity value 14 in the shadowed region 628 of the one-dimensional intensity distribution 620 on account of the shadow 626 formation.

In the example of FIGS. 10 and 11, the edge candidate of the edge candidates 612, 614 determined in step S4 which is located closest to the shadowed region 628 of the one-dimensional intensity distribution 620 is determined as the image representation of the edge 110 (FIG. 2) in step S5 of the method. This is the edge candidate 612 at the position $x_2$ in the example of FIG. 11.

In some implementations, the first determination device 232, the second determination device 234, and the third determination device 236 can be implemented by hardware, such as one or more add-on cards having one or more discrete electronic components and/or integrated circuits, one or more digital signal processors (DSPs), and/or one or more application specific integrated circuits (ASICs). The first, second, and third determination devices can share components. For example, the first determination device 232 can include an input interface for receiving input data, and memory to store data. The first determination device 232 can include data processing circuitry configured to process the input data to determine a plurality of edge candidates (e.g., 312, 314) for an image representation of the edge (e.g., 110) of the at least one second segment (e.g., 114) on the basis of gradients (e.g., 316, 318) of the two-dimensional intensity distribution (e.g., 304), according to the processes described above. The first determination device 232 can include an output interface for outputting the plurality of edge candidates (e.g., 312, 314). The second determining device 234 can include an input interface to receive input data, and memory to store data. The second determining device 234 can include data processing circuitry configured to process the input data to determine a one-dimensional intensity distribution (e.g., 320) of the image (e.g., 300) in a direction (e.g., R) perpendicular to the plurality of edge candidates (e.g., 312, 314), wherein in the direction (e.g., R), the one-dimensional intensity distribution (e.g., 320) includes a first region (e.g., 306') with a first mean intensity value (e.g., 11), the plurality of edge candidates (e.g., 312, 314), and a second region (e.g., 308') with a second mean intensity value (e.g., $I_2$) greater than the first mean intensity value (e.g., $I_1$), according to the processes described above. For example, the second determination device 234 can include an output interface for outputting the one-dimensional intensity distribution of the image in the direction perpendicular to the plurality of edge candidates. In some implementations, the third determination device 236 can include an input interface for receiving input data, and memory to store data. The third determination device 236 can include data processing circuitry configured to process the input data to determine the edge candidate of the plurality of edge candidates (e.g., 312, 314) by selecting among the plurality of edge candidates (e.g., 312, 314) the edge candidate that is closest to the first region (e.g., 306') of the one-dimensional intensity distribution (e.g., 320) as the image representation of the edge (e.g., 110) of the at least one second segment (e.g., 114), according to the processes described above. For example, the third determination device 236 can include an output interface for outputting the determined edge candidate as the image representation of the edge of the at least one second segment.

In some implementations, the first determination device 232, the second determination device 234, and the third determination device 236 can read input data from memory (or other storage devices, such as non-volatile storage devices, or cloud storage), process the data, and save the processed data to the memory (or the other storage devices).

In some implementations, the first determination device 232, the second determination device 234, and the third determination device 236 can be implemented by one or more data processors executing software modules according to the processes described above.

In some implementations, the computing apparatus 226 can include one or more data processors for processing data, and one or more storage devices for storing data and program code, such as one or more computer programs including instructions that when executed by the one or more data processors cause the one or more data processors to carry out the processes described above. The computing apparatus 226 can include one or more input devices, such as a keyboard, a mouse, a touchpad, and/or a voice command input module, and one or more output devices, such as a display, and/or an audio speaker. In some implementations, the computing apparatus 226 can include digital electronic circuitry, computer hardware, firmware, software, or any combination of the above.

For example, the computing apparatus 226 can be used to receive input data and execute program instructions to implement the features related to processing of data, such as one or more of the following: a) determining (S2) a plurality of edge candidates (312, 314) for an image representation of the edge (110) of the at least one second segment (114) on the basis of gradients (316, 318) of the two-dimensional intensity distribution (304), b) determining (S3) a one-dimensional intensity distribution (320) of the image (300) in a direction (R) perpendicular to the plurality of edge candidates (312, 314), wherein in the direction (R), the one-dimensional intensity distribution (320) comprises a first region (306') with a first mean intensity value ($I_1$), the plurality of edge candidates (312, 314) and a second region (308') with a second mean intensity value ($I_2$) greater than the first mean intensity value ($I_1$), and c) determining (S4) the edge candidate of the plurality of edge candidates (312, 314) which among the plurality of edge candidates (312, 314) is closest to the first region (306') of the one-dimensional intensity distribution (320) as the image representation of the edge (110) of the at least one second segment (114). Alternatively or addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

In some implementations, the operations associated with processing of data described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment.

For example, the computing apparatus 226 can be configured to be suitable for the execution of a computer program and can include, by way of example, both general and special purpose microprocessors, and any one or more processors of any kind of digital computer. Generally, a processor will receive instructions and data from a read-only storage area or a random access storage area or both. Elements of the computing apparatus 226 can include one or more processors for executing instructions and one or more storage area devices for storing instructions and data. Generally, the computing apparatus 226 will also include, or be operatively coupled to receive data from, or transfer data to, or both, one or more machine-readable storage media, such as hard drives, magnetic disks, solid state drives, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM, DVD-ROM, and/or Blu-ray discs.

In some implementations, the processes that involve processing of data can be implemented using software for execution on one or more mobile computing devices, one or more local computing devices, and/or one or more remote computing devices. For instance, the software forms procedures in one or more computer programs that execute on one or more programmed or programmable computer systems, either in the mobile computing devices, local computing devices, or remote computing systems (which may be of various architectures such as distributed, client/server, or grid), each including at least one processor, at least one data storage system (including volatile and non-volatile memory and/or storage elements), at least one wired or wireless input device or port, and at least one wired or wireless output device or port.

In some implementations, the software may be provided on a medium, such as a CD-ROM, DVD-ROM, Blu-ray disc, solid state drive, or hard disk drive, readable by a general or special purpose programmable computer or delivered (encoded in a propagated signal) over a network to the computer where it is executed. The functions can be performed on a special purpose computer, or using special-purpose hardware, such as coprocessors. The software can be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system can also be considered to be implemented as a computer-readable storage medium, configured with a computer program, where the storage medium so configured causes a computer system to operate in a specific and predefined manner to perform the functions described herein.

Although the present invention has been described on the basis of exemplary embodiments, it can be modified in diverse ways.

LIST OF REFERENCE SIGNS

100 Sample
104 Microstructure
106 Element
108 Area
110 Edge
110*a* Edge
110*b* Edge
110*c* Edge
112 Segment
114 Segment

116 Surface
118 Surface
120 Wall
122 Substrate
200 Image recording device
202 Electron beam
204 Housing
206 Pump
208 Sample stage
210 Electron column
212 Electron source
214 Electron or beam optics
216 Deflection unit
218 Detector
220 Gas provision unit
222 Valve
224 Gas line
226 Computing apparatus
228 Control device
230 Production device
232 Determination device
234 Determination device
236 Determination device
300, 300" Image
302 Pixel
304 Intensity distribution
306, 306' Region
308, 308', 308" Region
310, 310', 310" Edge brightening
312 Candidate
314 Candidate
316 Gradient
318 Gradient
320 Intensity distribution
322 Line
324 Gradient
326 Shadow
328 Region
400 Sample
406*a* Region
406*b* Region
406*c* Region
410*a* Edge brightening
410*b* Edge brightening
412*a* Segment
412*b* Segment
412*c* Segment
414 Segment
408 Region
410*a*, 410*b* Edge brightening
500 Image
600 Image
604 Intensity distribution
606 Region
608 Region
610 Edge brightening
612 Candidate
614 Segment
616 Gradient
618 Gradient
620 Intensity distribution
626 Shadow
628 Region
dI/dx Gradient (first derivative)
E Plane
H Height
H2 Height
H1 Height
ΔH Height
$I_1$, $I_2$ Intensity
$I_1'$, $I_2'$ Intensity
$I_3$, $I_3$ Intensity
$I_i$ Intensity
R Direction
S Line-of-sight
S2-S5 Method steps
Th Threshold value
x, y, Z Direction
$x_1$, $x_2$ Position

What is claimed is:

1. A method for analyzing an image of a microlithographic microstructured sample, wherein the sample comprises at least one first segment and at least one second segment which has an edge and is raised vis-à-vis the first segment, and wherein the image includes a plurality of pixels and a two-dimensional intensity distribution depending on the pixels, the method comprising the following steps:

a) determining a plurality of edge candidates for an image representation of the edge of the at least one second segment on the basis of gradients of the two-dimensional intensity distribution, b) determining a one-dimensional intensity distribution of the image in a direction perpendicular to the plurality of edge candidates, wherein in the direction, the one-dimensional intensity distribution comprises a first region with a first mean intensity value, the plurality of edge candidates and a second region with a second mean intensity value greater than the first mean intensity value, and c) determining the edge candidate of the plurality of edge candidates which among the plurality of edge candidates is closest to the first region of the one-dimensional intensity distribution as the image representation of the edge of the at least one second segment.

2. The method of claim 1, wherein the first region of the one-dimensional intensity distribution of the image is based on an image representation of the at least one first segment of the sample, and the second region of the one-dimensional intensity distribution of the image is based on an image representation of the at least one second segment of the sample.

3. The method of claim 1, wherein the at least one first segment of the sample includes a first material, and the at least one second segment of the sample includes a second material that differs from the first material.

4. The method of claim 3, wherein the second mean intensity value in the second region of the one-dimensional intensity distribution of the image is greater than the first mean intensity value in the first region of the one-dimensional intensity distribution of the image on account of the difference in materials between the at least one first and second segment of the sample.

5. The method of claim 1, wherein the at least one first and second segment of the sample include the same material.

6. The method of claim 5, wherein the second mean intensity value in the second region of the one-dimensional intensity distribution of the image is greater than the first mean intensity value in the first region of the one-dimensional intensity distribution of the image on account of a shadow formed adjacent to the edge of the at least one second segment of the sample.

7. The method of claim 1, wherein a predetermined threshold value is applied when determining the plurality of edge candidates on the basis of the gradient of the two-dimensional intensity distribution, in such a way that a corresponding edge candidate is determined for gradients of the two-dimensional intensity distribution whose absolute value is greater than the predetermined threshold value, and no edge candidate is determined for gradients of the two-dimensional intensity distribution whose absolute value is less than or equal to the predetermined threshold value.

8. The method of claim 1, wherein step a) is preceded by image preprocessing for reducing a noise component of the two-dimensional intensity distribution.

9. The method of claim 1, wherein the microstructured sample is designed for an operating wavelength of less than 250 nm, and/or the microstructured sample comprises at least one of a lithography mask, an EUV lithography mask, a DUV lithography mask, or a wafer structured by microlithography.

10. The method of claim 1, wherein the at least one first segment of the sample includes a light-transmitting or light-reflecting material, and the at least one second segment of the sample includes a light-absorbing material.

11. A non-transitory computer readable medium storing a computer program product comprising instructions that, upon execution of the program by at least one computer, cause the latter to carry out a method according to claim 1.

12. An apparatus for analyzing an image of a microlithographic microstructured sample, wherein the sample comprises at least one first segment and at least one second segment which has an edge and is raised vis-à-vis the first segment, wherein the image includes a plurality of pixels and a two-dimensional intensity distribution depending on the pixels, and wherein the apparatus comprises:

a first determination device for determining a plurality of edge candidates for an image representation of the edge of the at least one second segment on the basis of gradients of the two-dimensional intensity distribution, a second determination device for determining a one-dimensional intensity distribution of the image in a direction perpendicular to the plurality of edge candidates, wherein in the direction, the one-dimensional intensity distribution comprises a first region with a first mean intensity value, the plurality of edge candidates and a second region with a second mean intensity value greater than the first mean intensity value, and a third determination device for determining the edge candidate of the plurality of edge candidates which among the plurality of edge candidates is closest to the first region of the one-dimensional intensity distribution as the image representation of the edge of the at least one second segment.

13. The apparatus of claim 12, comprising an image recording device comprising a scanning particle microscope configured to obtain the image of the microlithographic microstructured sample by scanning a particle beam across a surface of the microstructured sample, the scanning particle microscope comprising:

a particle source configured to provide a particle beam;

beam optics configured to focus the particle beam and direct the particle beam to the microstructured sample;

a deflection unit configured to guide the particle beam over a surface of the microstructured sample; and a detector configured to detect at least one of secondary or backscattered particles from the microstructured sample.

14. The apparatus of claim 13 wherein the scanning particle microscope comprises a scanning electron microscope;

wherein the particle source comprises an electron source configured to provide an electron beam;

wherein the beam optics comprises electron optics configured to focus the electron beam and direct the electron beam to the microstructured sample;

wherein the deflection unit is configured to guide the electron beam over the surface of the microstructured sample; and wherein the detector is configured to detect at least one of secondary or backscattered electrons from the microstructured sample.

15. The apparatus of claim 13 wherein the scanning particle microscope comprises a gas provision unit configured to supply process gas to the surface of the microstructured sample;

wherein the scanning particle microscope is configured to direct the particle beam at a location on the surface of the microstructured sample to carry out particle-beam induced processing using the process gas supplied by the gas provision unit to at least one of deposit material on the surface of the microstructured sample or etch material from the microstructured sample;

wherein the particle-beam induced processing is based on information about the determined edge candidate as the image representation of the edge of the at least one second segment.

16. The apparatus of claim 12, comprising a computing apparatus comprising:

a data storage device storing a first set of instructions, a second set of instructions, and a third set of instructions; and at least one data processor configured to execute the first set of instructions to implement the first determination device, execute the second set of instructions to implement the second determination device, and execute the third set of instructions to implement the third determination device.

17. The method of claim 1, comprising performing at least one of depositing material on the surface of the microstructured sample or etching material from the microstructured sample based on information about the determined edge candidate as the image representation of the edge of the at least one second segment.

18. The method of claim 9 wherein the microstructured sample is designed for an operating wavelength of less than 100 nm.

19. The method of claim 9 wherein the microstructured sample is designed for an operating wavelength of less than 15 nm.

20. The method of claim 9 wherein the microstructured sample comprises at least one of the EUV lithography mask or the DUV lithography mask.

* * * * *